United States Patent [19]
Kelly

[11] Patent Number: 5,174,647
[45] Date of Patent: Dec. 29, 1992

[54] MODULAR LIGHTING SYSTEM

[76] Inventor: Steven M. Kelly, Box 139, Cromwell, Ind. 46732

[21] Appl. No.: 763,325

[22] Filed: Sep. 20, 1991

[51] Int. Cl.⁵ .............................................. F21S 3/00
[52] U.S. Cl. .................................. 362/221; 362/225; 362/250; 362/251
[58] Field of Search ............... 362/217, 219, 221, 225, 362/250, 251, 368

[56] References Cited

U.S. PATENT DOCUMENTS

| | | | |
|---|---|---|---|
| 4,351,017 | 9/1982 | Ball | 362/368 |
| 4,367,417 | 1/1983 | Casasanta | 362/225 |
| 4,654,765 | 3/1987 | Laidman | 362/219 |
| 4,712,165 | 12/1987 | Cetrone | 362/219 |
| 4,748,545 | 5/1988 | Schmidt | 362/219 |
| 4,866,581 | 9/1989 | Targetti | 362/225 |
| 4,979,081 | 12/1990 | Leach et al. | 362/225 |
| 4,994,943 | 2/1991 | Aspenwall | 362/219 |
| 5,045,981 | 9/1991 | Nagano | 362/219 |

FOREIGN PATENT DOCUMENTS 0089713  9/1983  European Pat. Off. ............ 362/225

Primary Examiner—Stephen F. Husar
Attorney, Agent, or Firm—Roger M. Rickert

[57] ABSTRACT

A modular electrical wiring systems with pluggable lighting is disclosed including thin variable length, lighted wands, extension cables, accessory options, switching options, and a source of supply cable. Preferred power is economical multi-wire branch circuit with related switching options. One male connector per device locks out undesirable multiple power supply in every component. Lighted wands offer rigid proportional length bodies and flexible, semi-fixed length tolerance adjusting cables to enable proper light dispersement and branching in several directions. Connectors at opposite ends of each wand, and related extension cables, enable close or distant lights to be energized. The female connector version also accepts almost any desired combination of these circuit(s) choosing devices: receptacles, ballasts, other lighting/accessories, and switching devices; all as, and where the user chooses.

23 Claims, 3 Drawing Sheets

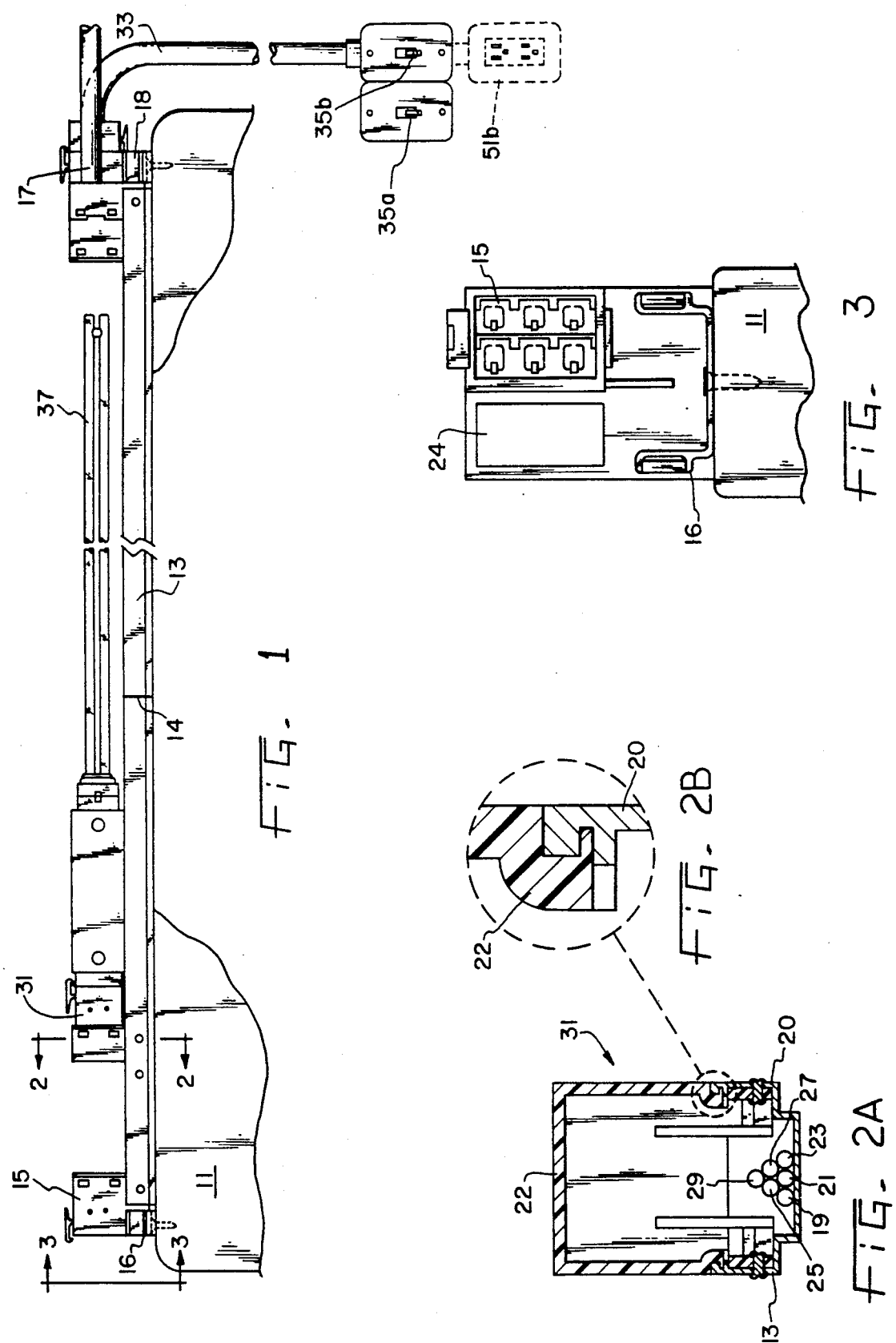

MODULAR LIGHTING SYSTEM

SUMMARY OF THE INVENTION

The present invention relates generally to electrical energy distribution systems of the type which may be configured by the user without the need for tools nor the services of a professional electrician and more especially to such power distribution systems of the modular type which are frequently incorporated into or used in conjunction with prefabricated and prewired office partitions and similar furniture. In particular, the present invention relates to lighting and more specifically, to modular lighting that is prewired with plugs not requiring tools or the services of a qualified electrician, for installation or relocation, including user choice of switching locations.

The environment for the preferred embodiment of the lighting system relates to use in prefabricated office partitions with power and/or communication raceways running along the top and/or bottom edges. Prewired office partitions and similar modular furnishings with power and/or communications wiring running in raceways along the top or bottom of the partitions have been known for a number of years. The following U.S. Patents are exemplary, but by no means exhaustive of such modular electrical wiring arrangements. Prewired power systems for wall panels where power outlets or receptacles are positioned in predetermined fixed locations along a power raceway extending near the bottom of the panel, and jumper cables interconnect two or more such panels, again between predetermined locations along the raceways, are disclosed in the U.S. Pat. No. 4,060,294. A variation on the previous patent which allows a measure of selectability of one of multiple circuits extending through the raceway is shown in the U.S. Pat. No. 4,367,370. An improvement which allows positioning of the power outlets or receptacles at virtually any location along the power distribution system are shown in my U.S. Pat. Nos. 4,688,869 and 4,825,540. The U.S. Pat. No. 4,408,820 illustrates improvements in the terminals used to interconnect conduits while, at the same time allowing the connection of taps such as power receptacles to the wiring within the conduits. A number of other somewhat similar techniques for connecting receptacles to modular wiring systems are also known. Illustrative of such known power only systems are U.S. Pat. Nos. 4,056,297 and 4,135,775.

Heretofore, partition mounted lighting has been clumsily mounted on cantilever shelves or cabinetry in up or down light modes. This lighting has been adapted from mass produced commercially available fixtures either cord and plug connected or hardwired by qualified electricians. Shaw Walker of Muskegon Mich. successfully placed up-lighting in panels, but units were basically hardwired. A number of other companies have supplied pluggable architectural lighting fixtures. These lights, however, are not readily modular or adaptable to such uses as prefabricated office partitions. These systems are too large; lights do not adjust in length; many do not control direction of power flow; switching methods have been of the start of the run type or circuit breakers at the power box; and the units are not capable of modular branching.

Pluggable modular electrical systems began in 1976 with Tiffany Industries, St Louis, Mo. More recently, a greatly improved wand concept has been manufactured since 1981 by Union Products, Cromwell IN. and is a commercial success in the prefabricated office partition industry. Heretofore the wand was a power only system. The present invention combines the flexible advantages of sophisticated modular electrical packages with previously clumsy lighting methods. The new result is a sophisticated lighting method.

Lighting systems generally suffer from one or more of the following defects:

Office lighting has been ceiling hung or attached to shelves or cabinets where lighting quality has suffered.

Rather than results of diffused general illumination, users have experienced islands of light generally known as hot spots.

If normally hardwired lights offered pluggability, it was cord and wall plug without interconnectability (by code) or, custom lengths of jumper cables were specified to interconnect.

Connection of the lighting or power source by alternate paths and alternate fusing may sometimes occur in these known systems thereby dangerously multiplying ampacity fuse thresholds. Adverse power factor or high ampacity lighting has required electricians to pull new circuits to continue runs of lighting.

Ambient lights have generally been switched in an uneconomical all on or none option.

Among the several objects of the present invention may be noted the provision of a modular, lighted, pluggable wand which obviates the foregoing prior art limitations; the provision of a light wand having one or more circuits independently fused, multiple circuits providing economy of known multi-wire branch circuits to enable lighting options not limited to every other, or district, switching and economy of long lighting runs in typically up to four directions with a single point of attachment to building power; the provision of a light wand with pluggable circuit choosing ballasts; the provision of user choice of switching location(s) for individual or multiple switches controlling one or more of aforementioned circuits(s); provision for semi-fixed length unit to unit cables including an adjacent additional connector for branching in typically up to four directions; provision for aforementioned semi-fixed length cables to adapt to common tolerance length adjustment of several inches; provision for receipt of power to each unit from but a single source of supply, singly or multiply fused; the provision of size suitable for use in relatively skinny raceways; the provision of reflectors and/or wands and/or lamps of lengths proportional to aforementioned raceways; the provision of prewired or pluggable accessory lighting selection unit(s) for chice of circuits; the provision of a means to power and switch adjacent lighting such as wall hung theater lighting; the provision of no tools installation not requiring the services of an electrician excepting first connection to building power; the provision of extension cables to economically continue power where lighting is not desirable; and the provision for every other or otherwise intermittently switched lights to economically lower lighting levels. These as well as numerous other objects and advantageous features of the present invention will be in part apparent and in part pointed out hereinafter.

In general, an electrical circuit element such as a ballast or starter which actively participates in the process of energizing of a fluorescent lamp is enclosed in a relatively rigid enclosure having a first electrical connector fixed thereto at one end for pluggably receiving and making electrical connection with the fluorescent lamp and a second electrical connector fixed thereto at the other end for pluggably connecting to a source of electrical energy. The electrical circuit element and other wiring within the enclosure supply electrical energy from the source to the lamp. A movable vertical panel having a third electrical connector fixed along the top edge thereof receives the second electrical connector thereby providing a light source atop the panel. The panel supports an enclosed relatively rigid raceway, a fourth electrical connector, and a plurality of insulated conductors disposed within the relatively rigid raceway. Certain ones of the conductors are electrically connected at one end to the third electrical connector and at the other end to the fourth electrical connector. Depending on the connections, this fourth connector may provide a source of electrical energy to the raceway and to the lamp or it may provide for connection to a fifth electrical connector having an elongated flexible metal or plastic conduit mechanically connected at one end thereof to the fifth electrical connector and terminating in either a lamp controlling switch or a conventional duplex outlet.

Also in general and in one form of the invention, a top mounting modular electrical wiring system for upstanding wall panels includes an elongated raceway adapted to extend along the top edge of a panel, first and second electrical connectors fixed near opposite ends of the raceway, a plurality of insulated electrical conductors disposed within the raceway and electrically connected to the first and second electrical connectors, and a lamp receiving electrical connector fixed to the raceway intermediate the first and second electrical connectors. A flexible conduit extends from the raceway and has a lamp controlling switch near the remote end thereof. The lamp receiving connector is adapted to receive a lamp by relative movement between the lamp and the lamp receiving electrical connector in a direction generally parallel to the direction of raceway elongation.

Still further and in one form of the invention, an electrical energy distribution system has a plurality of elongated relatively rigid power distribution raceways and a plurality of flexible multiconductor cables each having connectors at opposite ends thereof for interconnecting pairs of power distribution raceways. Each raceway has connectors at opposite ends adapted to mechanically and electrically mate with corresponding ones of the raceway connectors, and at least one of said raceways has an additional connector intermediate the end connectors for receiving and supporting, in a cantilevered manner, a lamp assembly.

BRIEF DESCRIPTION OF THE DRAWING

FIG. 1 is an elevation view of a panel mounted up-lighting modular wiring system having a cantilever supported fluorescent lamp and incorporating the present invention in one form;

FIG. 2 is a view in cross-section along lines 2—2 of FIG. 1;

FIG. 3 is an end view of the up-lighting wiring system along lines 3—3 of FIG. 1;

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 4:
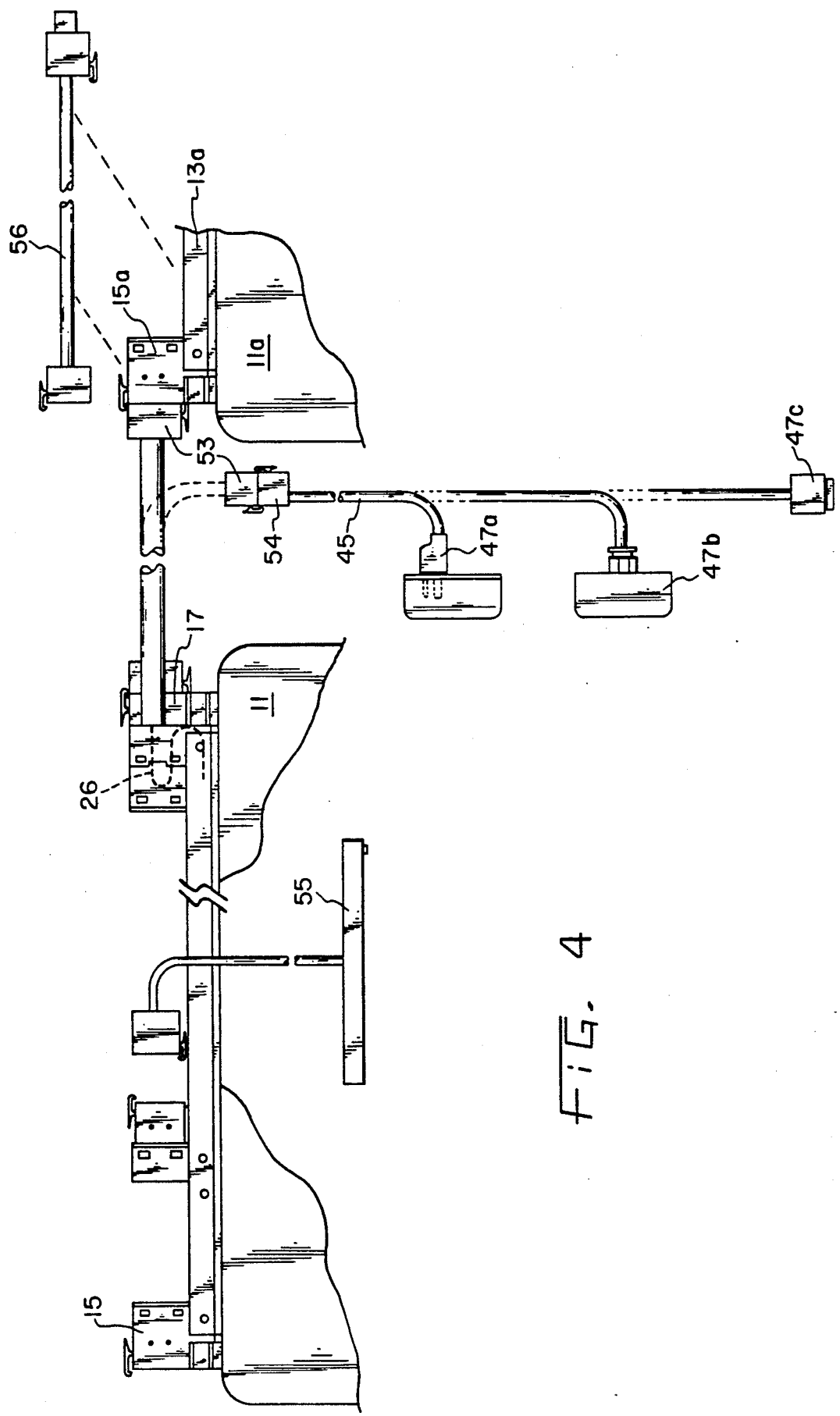
FIG. 4 is an elevation view of the panel mounted up-lighting modular wiring system of FIG. 1, but with the fluorescent lamp and ballast removed and illustrating panel interconnection and power input techniques.

A top mounting modular electrical wiring system for upstanding wall panels 11 or similar movable vertical panels is shown in FIG. 1 and includes an elongated raceway 13 adapted to extend along the top edge of the panel 11. This raceway may, if desired be formed of two telescoping portions as indicated by dividing line 14 to allow some adjustment of its overall length to fit it to a particular panel. A first electrical connector 15 and a second electrical connector 17 are fixed near opposite ends of the raceway 13. Connector 17 may hold excess wiring as indicated by the dotted lines 18, to enable telescopic adjustment for connector 53 (FIG. 4). A plurality of insulated electrical conductors 19, 21, 23, 25, 27 and 29 (FIG. 2) are disposed within the raceway 13 and electrically connected to the first and second electrical connectors 15 and 17. There is an additional lamp receiving electrical connector 31 fixed to the raceway, and a flexible conduit 33 extends from the raceway and has one or more lamp controlling switches 35a and 35b near the remote end thereof. The lamp receiving electrical connector 31 is fixed to the raceway in much the same way as connectors 15 and 17 as will be discussed subsequently in conjunction with FIG. 2. The lamp receiving connector is located between the first and second electrical connectors 15 and 17, and is adapted to receive a ballast assembly and then a lamp, such as fluorescent lamp 37, by relative movement between the lamp and the lamp receiving electrical connector in a horizontal direction generally parallel to the direction of raceway elongation. The lamp 37 and pluggable ballast assembly 39 may be removed as a unit in this way or the lamp 37 may be removed from the ballast assembly 39 as desired. Lamp 37 is preferably of the type formed by folding a hollow glass tube so that all electrical connections are at one end. The lamp may, of course, be provided with a transparent or translucent cover if desired.

Figure 6:
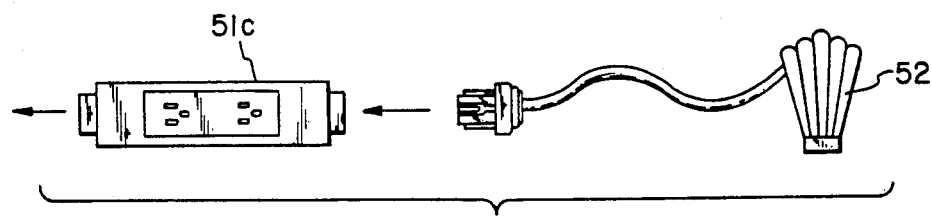
FIG. 6 is an elevation view of a theatre light and duplex outlet as an alternative to the fluorescent lamp and ballast of FIG. 5.
Figure 5:
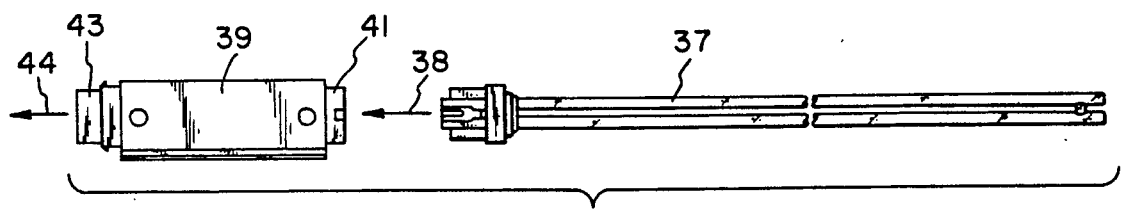
FIG. 5 is an elevation view of the fluorescent lamp and ballast of FIG. 1.

The raceway is snap fit fastened to panel 11 by a pair of generally U-shaped mounting brackets 16 and 18 with vertical screws into the panel 11, see FIGS. 1, 3 and 4. FIG. 2 shows one way in which the connectors such as 31 may be fixed to the metal or plastic raceway 13. The snap fit profile in FIG. 2 is also used to releasably mount ballast assembly 39 or receptacle assembly 51c in FIGS. 5 and 6 respectively, to the raceway 13. The metal channel 20 receives a portion of the connector which is held in place by rivets such as 24 and second portion of the connector formed as a plastic cover 22. The snap fit attachment of cover 22 to the metal channel 20 as shown in the enlargement may be used for any of the connectors.

In FIG. 3, the six contacts in the connector 15 are visible. A like connector 24 may be provided either facing toward the paper to provide for connection to a panel extending perpendicular to panel 11, or away from the plane of the paper (facing the same direction as connector 15) to provide for a downwardly extending conduit like 33, or 45. These downwardly extending conduits may provide for connections to switches which control up-lighting such as fluorescent tube 37, or provide for connections to a task light such as 55, or connect to a conventional duplex outlet such as 51c and 51a of FIGS. 6 and 7 respectively, and 51b in FIG. 1. They may even provide the power input lines to the system as will be discussed in conjunction with FIG. 4.

The light, which may be the fluorescent lamp 37 or alternatively, a wall sconce, task light 55 which directs light downwardly, or theatre light 52 which directs light upwardly, is generally associated with one or more connecting electrical circuit elements which (actively in the case of the fluorescent lamp) participate in the process of energizing the lamp or light which circuit element is housed in a relatively rigid enclosure 39 or 51c. Circuiut elements or components as used herein include connectors, switches, outlets, ballasts, starters and other electrical components while active circuit components or elements is limited to elements such as the starter or ballast which participates in the lighting function in some way beyond merely providing a conductive path. The fluorescent lamp 37 and active circuit element enclosure 39 have been removed and are shown separately and unplugged from one another in FIG. 5. The alternative theatre lamp 52 and duplex assembly 51c are shown separately in FIG. 6. Enclosure 39 is typically a pluggable ballast module which mates with connector 31 by motion in the direction of arrow 44. Enclosure 39 could also include a duplex outlet like assembly 51c if desired. The ballast module pluggably receives the lamp 37 by a coaxial motion along line 38. Thus, the lamp alone may be removed from the structure, or lamp 37 and ballast 39 may be removed together as a unit. Similarly, light 52 may be removed alone or light 52 and duplex unit 51c may be removed as a unit. Enclosure 39 has a first electrical connector 41 fixed thereto at one end thereof for pluggably receiving and making electrical connection with the fluorescent lamp and a second electrical connector 43 fixed thereto at the other end thereof for pluggably connecting to a source of electrical energy such as electrical connector 15 which is shown coupled by way of flexible cable 45 to a power outlet connection at 47. FIG. 4 illustrates several alternatives of power outlet, namely a pluggable interconnection 47a, a directly wired connection 47b, or a baseboard connection 47c. Within the enclosure 39 there may be a starter and ballast, or simply a ballast 49 (FIG. 7) or other active circuit elements (as opposed to mere conductors) for supplying electrical energy from the source to the fluorescent lamp.

Figure 7:
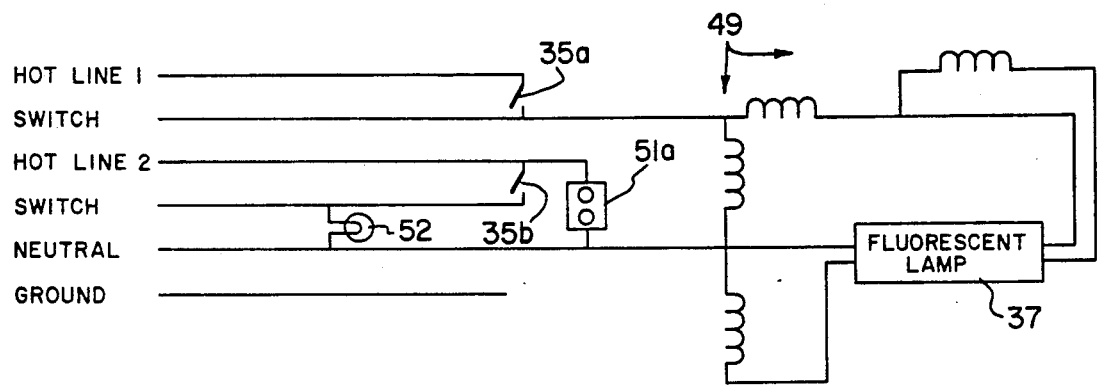
FIG. 7 is an electrical schematic showing one way of connecting lamps, switches and outlets in the present invention.

The connector 17 may, as shown in FIG. 1 connect to an electrical circuit component such as the switch 35a or 35b, or a conventional duplex electrical outlet 51b as is also shown in FIG. 7. In either case, the circuit component is mechanically connected to the other end of conduit 33 and is electrically connected to insulated conductors within the conduit. In FIG. 4, the electrical circuit component is shown as an electrical connector 53 for connecting to connector 15a of an adjacent similar raceway 13a disposed atop a similar movable panel 11a, or, in the alternative, to a choice of power supplies 47 by way of connector 54. As another alternative, an extension cable 56 may replace 13a. The other conduit 45 of FIG. 4 shows this electrical circuit component as an electrical connector 47 for connecting to a source of electrical energy. As illustrated, conduit 45 is provided with a connector 54 to mate with connector 53.

The six insulated conductors of FIG. 2 are shown schematically in FIG. 7 as are the duplex outlet 51a, ballast coil 52, switches 35a and 35b and lamps 37 and 52. The six conductors may comprise two hot lines, two switch lines, a neutral line and a ground line as shown. Clearly, not all lines are connected at every connector. For example, a connector which couples to a switch 35 need not be connected to both hot lines, nor to both switch lines.

From the foregoing, it is now apparent that a novel lighting feature for modular or similar wiring systems has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. In combination with a fluorescent lamp, an electrical circuit element which actively participates in the process of energizing the fluorescent lamp, a relatively rigid enclosure having a first electrical connector fixed thereto at one end thereof for pluggably receiving and making electrical connection with the fluorescent lamp and a second electrical connector fixed thereto at the other end thereof for pluggably connecting to a source of electrical energy, means within the enclosure including the electrical circuit element for supplying electrical energy from the source to the lamp a movable vertical panel having a third electrical connector fixed along the top edge thereof for receiving the second electrical connector, and enclosed relatively rigid raceway, a fourth electrical connector, and a plurality of insulated conductors disposed within the relatively rigid raceway, certain ones of the conductors being electrically connected at one end to the third electrical connector and at the other end to the fourth electrical connector.

2. The combination of claim 1 further comprising a fifth electrical connector, an elongated flexible conduit mechanically connected at one end thereof to the fifth electrical connector, a further plurality of insulated conductors disposed in the flexible conduit and electrically connected to the fifth electrical connector, and an electrical circuit component mechanically connected to the other conduit end and electrically connected to the insulated conductors within the conduit.

3. The combination of claim 2 wherein the electrical circuit component comprises a switch for controlling the supply of electrical energy to the fluorescent lamp.

4. The combination of claim 2 wherein the electrical circuit component comprises a conventional duplex outlet.

5. The combination of claim 2 wherein the electrical circuit component comprises an electrical connector for connecting to an adjacent similar raceway disposed atop a similar movable panel.

6. The combination of claim 2 wherein the electrical circuit component comprises an electrical connector for connecting to a source of electrical energy.

7. The combination of claim 1 wherein the enclosed relatively rigid raceway is formed of two telescoping portions to allow some adjustment of its overall length to fit it to a particular panel.

8. The combination of claim 1 wherein the top edge of the vertical panel is generally horizontal, the third electrical connector pluggably receiving and making electrical connection with the second electrical connector by relative movement therebetween in the direction of elongation of the relatively rigid enclosure along the top edge of the panel.

9. The combination of claim 1 wherein the electrical circuit element is a ballast.

10. A top mounting modular electrical wiring system for upstanding wall panels comprising an elongated raceway adapted to extend along the top edge of a panel, first and second electrical connectors fixed near opposite ends of the raceway, a plurality of insulated electrical conductors disposed within the raceway and electrically connected to the first and second electrical connectors, a lamp receiving electrical connector fixed to the raceway intermediate the first and second electrical connectors, the lamp receiving electrical connector being adapted to receive a lamp by relative movement between the lamp and the lamp receiving electrical connector in a direction generally parallel to the direction of raceway elongation, and a flexible conduit extending from the raceway and having a lamp controlling switch near the remote end thereof.

11. The top mounting modular electrical wiring system of claim 10 further comprising a fluorescent lamp, a relatively rigid enclosure having a first electrical connector fixed thereto at one end thereof for pluggably receiving and making electrical connection with the fluorescent lamp and a second electrical connector fixed thereto at the other end thereof for pluggably connecting to the lamp receiving electrical connector, and means within the enclosure including the electrical circuit element for supplying electrical energy from the source to the lamp.

12. The top mounting modular electrical wiring system of claim 11 wherein the electrical circuit element is a ballast.

13. The top mounting modular electrical wiring system of claim 10 further comprising a second flexible conduit extending from the raceway and having a conventional duplex outlet near the remote end thereof.

14. The top mounting modular electrical wiring system of claim 10 further including a second flexible conduit extending from the raceway and having an electrical connector near the remote end thereof for connecting to an adjacent similar raceway disposed atop a similar upstanding panel.

15. The top mounting modular electrical wiring system of claim 10 wherein the raceway is formed of two telescoping portions to allow some adjustment of its overall length to fit it to a particular panel.

16. An electrical energy distribution system having a plurality of elongated relatively rigid power distribution raceways and a plurality of flexible multiconductor cables each having connectors at opposite ends thereof for interconnecting pairs of power distribution raceways, each raceway having connectors at opposite ends adapted to mechanically and electrically mate with corresponding ones of the raceway connectors, at least one of said raceways having an additional connector intermediate the end connectors for receiving and supporting, in a cantilevered manner, an elongated fluorescent lamp assembly.

17. The electrical energy distribution system of claim 16 further including an additional flexible multiple conductor having a connector at one end adapted to mechanically and electrically mate with a corresponding one of the raceway connectors, and an electrical switch for controlling the supply of electrical energy to the lamp assembly at the other end.

18. The electrical energy distribution system of claim 16 further including an additional flexible multiple conductor having a connector at one end adapted to mechanically and electrically mate with a corresponding one of the raceway connectors, and an electrical outlet at the other end.

19. In combination with an elongated fluorescent electric lamp, a relatively rigid enclosure having a first electrical connector fixed thereto at one end thereof for pluggably receiving and making electrical connection with the electric lamp, and a second electrical connector fixed thereto at the other end thereof for pluggably connecting to a source of electrical energy, the enclosure having an electrical outlet accessible intermediate the first and second electrical connectors, and means within the enclosure including an electrical circuit element which actively participates in the process of energizing the fluorescent lamp for supplying electrical energy from the source to the lamp.

20. The combination of claim 22 further comprising a movable vertical panel having a third electrical connector fixed along the top edge thereof for receiving the second electrical connector, wherein the electric lamp is a lamp mounted on a side of the panel near the top edge thereof.

21. A top mounting modular electrical wiring system for upstanding wall panels comprising an elongated raceway adapted to extend along the top edge of a panel, first and second electrical connectors fixed near opposite ends of the raceway, a plurality of insulated electrical conductors disposed within the raceway and electrically connected to the first and second electrical connectors, a lamp receiving electrical connector fixed to the raceway, a lamp connected to the lamp receiving electrical connector and located near the top edge of the panel, and a flexible conduit extending downwardly from the raceway and having a circuit component near the remote end thereof.

22. The top mounting modular electrical wiring system of claim 21 wherein the lamp receiving electrical connector is fixed to the raceway intermediate the first and second electrical connectors and is adapted to receive a lamp by relative movement between the lamp and the lamp receiving electrical connector in a direction generally parallel to the direction of raceway elongation, and wherein the lamp is a fluorescent lamp, and further comprising a relatively rigid enclosure having a first electrical connector fixed thereto at one end thereof for pluggably receiving and making electrical connection with the fluorescent lamp and a second electrical connector fixed thereto at the other end thereof for pluggably connecting to the lamp receiving electrical connector, and means within the enclosure including the electrical circuit element for supplying electrical energy from the source to the lamp.

23. The top mounting modular electrical wiring system of claim 22 wherein the electrical circuit element is a ballast.

* * * * *